United States Patent [19]

Anderson

[11] 4,181,545

[45] Jan. 1, 1980

[54] HYDROXYLIC AROMATIC COMPOUNDS AS ADDITIVES FOR RUBBER-BASED, COMPOSITE SOLID PROPELLANTS

[75] Inventor: William S. Anderson, Sunnyvale, Calif.

[73] Assignee: United Technologies Corporation, Hartford, Conn.

[21] Appl. No.: 791,893

[22] Filed: Apr. 28, 1977

[51] Int. Cl.$^2$ .............................................. C06B 45/10
[52] U.S. Cl. ............................... 149/19.9; 149/19.92; 149/19.4; 528/75; 568/701; 260/439 CY
[58] Field of Search ...................... 149/19.9, 20, 19.92, 149/19.1; 528/75; 568/701; 260/439 CY

[56] References Cited

U.S. PATENT DOCUMENTS

| | | | |
|---|---|---|---|
| 3,338,764 | 8/1967 | Evans | 149/19.9 |
| 3,498,855 | 3/1970 | Harris | 149/19.91 |
| 3,698,969 | 10/1972 | Fein et al. | 149/20 |
| 3,706,611 | 12/1972 | Hastings | 149/19.1 |
| 3,726,729 | 4/1973 | Pierce | 149/100 |
| 3,811,964 | 5/1974 | Sayles | 149/19.1 |
| 3,884,736 | 5/1975 | Stack | 149/100 |
| 3,953,260 | 4/1976 | Braun et al. | 149/19.92 |
| 4,019,932 | 4/1977 | Schroeder | 149/19.1 |

*Primary Examiner*—Edward A. Miller
*Attorney, Agent, or Firm*—Steven F. Stone

[57] ABSTRACT

Contaminant metal ions of the transition elements such as copper and iron for example may give rise to serious problems in the curing of polymeric binders for conventional rubber-based solid propellants. These metal ions may accelerate the curing action to such a degree that the potlife of the freshly mixed polymer is reduced. Also, the metal ions may promote oxidative degradation of cured and uncured polymeric systems. These undesirable effects can be prevented by adding to the uncured polymer certain polymer-soluble agents which are capable of forming stable complexes with the undesirable metal ions in which the valence of the metal ion is fixed. These agents are selected from a large group of compounds and compositions comprising certain hydroxy substituted aromatic compositions. The preferred embodiments are pyrogallol, propyl gallate, octyl gallate, decyl gallate, purpurogallin and alizarin.

16 Claims, No Drawings

HYDROXYLIC AROMATIC COMPOUNDS AS ADDITIVES FOR RUBBER-BASED, COMPOSITE SOLID PROPELLANTS

BACKGROUND OF THE INVENTION

In the preparation of typical composite solid propellants, a liquid crosslinkable polymeric substance is used as a vehicle for the dispersing of the particular oxidizer material, burning rate catalyst, solid fuel, plasticizer and other materials normally incorporated into a crosslinked composite propellant. A crosslinking agent for the liquid polymer is added to the system and, after mixing, the mixed uncured propellant is cast into a suitable form and cured under the desired conditions of temperature and pressure. State-of-the-art propellant systems normally employ functionally active polymers such as the polybutadiene-acrylic acid-acrylonitrile polymers (PBAN), epoxy, hydroxy, and carboxy functional polybutadienes, polyisobutylenes, polyethers and polyesters. The crosslinking agents for these materials are commercially available compounds having the activity required by the particular functional group chosen. For example, if carboxyfunctionality is used in the polymer, an aziridinyl or epoxy crosslinking agent could be used. If hydroxyfunctionality is used in the polymer, an isocyanate crosslinking agent could be used. If epoxyfunctionality is used in the polymer, a carboxy crosslinking agent could be used, all as is known to the art.

In the manufacture of these propellants, it is sometimes necessary to add combustion catalysts which derive their activity from the presence of iron or copper. The iron may be present in the form of iron oxide or as ferrocene or a ferrocene derivative, for example. Other combustion catalysts involve the use of copper oxide, copper salts and compounds of various transition metals. Further, due to the equipment and ingredients used in the processing of a propellant, it is almost impossible to obtain a mix which is totally free of these metals even if compounds of these materials are not specifically added to the mix for any particular purpose.

It has been found that the presence of trace amounts of these metals in a free ionic form can so accelerate the curing action of the propellant that it is impossible to mix the material together to the desired degree of dispersion without the viscosity increasing to the point where it is no longer possible to cast the mixture into a suitable configuration. It has also been found that even if the potlife can be extended sufficiently to permit the casting of the propellant, the presence of this form of these metals tends to promote the subsequent degradation of the cured binder. This degradation is most commonly manifested by discoloration, hardening, or embrittlement of the propellant, particularly when the propellant is stored at temperatures higher than ambient in the presence of atmospheric oxygen. It appears most likely that these metals cause the undesirable effects on the cure by a catalysis of the cure reaction and the degradation of the propellants by the catalysis of oxidation reactions.

It is known that the undesirable effects of this form of these metals may be alleviated without destroying their effectiveness as combustion catalysts, if they have been added for that purpose, by adding a polymer soluble agent to the mixture, which agent is capable of reacting with the undesirable metals to form stable complexes in which the valence of the metal ion is fixed. This renders the metal inactive as a cure or oxidation catalyst without affecting the activity as a combustion catalyst. This approach is described, for example, in co-pending, co-assigned patent application of Nakagawa, et al, Ser. No. 539,209, filed Jan. 7, 1975, for Stabilizers For Solid Propellant Binders and in U.S. Pat. No. 3,801,385 to Mastrolia et al for Processing Aids for Hydroxy-Terminated Polybutadiene and U.S. Pat. No. 3,953,260 for Gossypol, An Abundant, Low-Cost Iron Deactivator, Pot-Life Extender, and Processing Aid for HTPB Propellants.

All of these approaches use materials which either are relatively expensive, difficult to manufacture or are toxic or unstable. According to this invention, I have discovered a class of compositions which are excellent potlife extenders and certain members of which are extremely inexpensive, abundant, stable and nontoxic.

It is, accordingly, an object of this invention to provide certain metal deactivating compositions for extending the potlife of polymers and improving their resistance to oxidative degradation.

It is another object of this invention to provide a method for extending the potlife of polymers and improving their resistance to oxidative degradation.

DESCRIPTION OF THE INVENTION

According to this invention, I have found that certain hydroxy-substituted aromatic compositions are extremely good chelating agents for copper, iron and transition element metals, which chelating agents are soluble in the liquid polymers, do not have an adverse effect on the cure of the polymer, and can be added to the polymer to extend the potlife of the uncured propellant and to prevent oxidative degradation of the cured polymeric system. The chelating agents need not be added in substantial amounts and in practice it has been found that less than 2% by weight of polymer (less than approximately 0.3% by weight of propellant) of the chelating agent is adequate to obtain the desired results. The normal range for the chelating agent, depending upon the amount of metal ion to be chelated, is in the range of 0.0% to 0.05% by weight of the overall mixture although greater or lesser amounts may be useful in certain cases. Suitable chelating agents include compounds and compositions having as the active component a member selected from the group consisting of

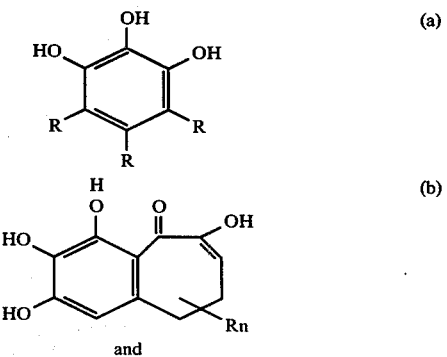

and

-continued

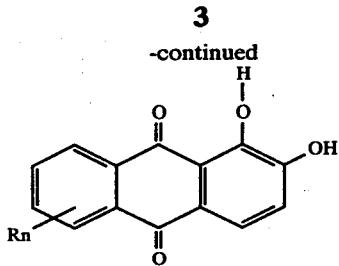

(c)

The number of suitable compounds and compositons considered by the inventor have been so wide and varied that it is not possible to put a structural limitation on the definition of R nor need all the R groups in a compound be the same. Instead the only criteria which the applicant has found that can define R is that the group not interfere with or contribute to the cure reaction of the polymeric system to which it is added and that it not decrease the solubility of the additive to the point where it is no longer effective as a potlife extender. Preferred embodiments of the invention are pyrogallol; in which R in formula (a) is hydrogen; propyl, octyl and decyl gallate in which one of the R groups in formula (a) is

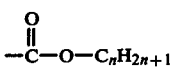

(n=3,8 and 10 respectively), purpurogallin in which each R in formula (b) is hydrogen and alizarin (1,2 dihydroxyanthraquinone) in which each R in formula (c) is hydrogen. Although these embodiments are preferred, other suitable materials are alkylated pyrogallols, purpurogallins and alizarins in which one or more of the R groups may be an alkyl group such as 1,2,3 trihydroxy-5-butyl benzene; other esters such as the lower alkyl esters (1-10 carbon atoms), pentaerythrityl and polybutadienyl esters; for example, the latter being produced by the esterification of gallic acid with hydroxyfunctional polybutadiene.

Further, gallamide in which one of the R groups in formula (a) is

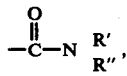

R' and R" being hydrogen or alkyl groups and condensation products of the amides, such as gallomine blue (the condensation product of nitrosodimethylanaline and gallamide) or the condensation products of gallic acid, such as gallocyanine (the condensation product of nitrosodimethylanaline and gallic acid) are also useful. Other suitable materials include the acetyl ferrocene condensation product of pyrogallol or purpurogallin, the gallotannins and the pyrogallol-formaldehyde condensation products such as 3,4,5,3',4',5', hexahydroxydiphenyl methane. Ketones in which one of the R groups is

such as gallacetophenone for example are also usable.

R can in some cases also be additional OH groups particularly in formula (c) as long as the substitution does not destroy the aromaticity of the compound. For example, 1,2,3 trihydroxyanthraquinone (anthragallol), 1,2,4 trihydroxyanthraquinone (purpurin), 1,2,6 trihydroxyanthraquinone (flavopurpurin) and hexahydroxyanthraquinone (rufigallic acid) can be used. With respect to formula (c) the material may exist in its diol form as shown or as the equivalent enol.

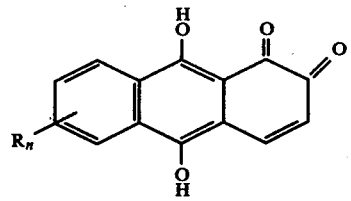

The unsubstituted form is clearly preferred but substitution within the general guidelines noted above are within the scope of this invention so long as they do not destroy the effectiveness of the material. It should be noted that the critical characteristic of the formula is the location of the hydroxy groups (in the diol form) on the adjacent 1,2 carbon atoms since as is apparent from Table I the corresponding compounds with the hydroxy groups in the 1,4 and 1,8 positions are not effective.

In addition to the specific compounds identified above, it has been noted that mixtures of these materials with other materials of uncertain overall composition are also useful. Thus extracts (either aqueous or alcoholic for example) of naturally occurring substances such as extract of nutgall, extract of oakgall, extract of tanbark and certain naturally occurring tanning depsides such as M-galloylgallic acid are also usable.

Thus it appears that the only unifying characteristic that all of these suitable compositions possess is the basic structural unit of formulas (a), (b) and (c) and that once present the R groups and diluent materials are not significant so long as they do not in some manner interfere with the chemistry of the polymer composition to which it is added. This can readily be determined by a chemist by routine experiment or by consideration of the chemistry of the polymer. Thus for example in the cure of a hydroxyfunctional polybutadiene with a diisocyanate curing agent one would not choose R in formula (a) to be

because gallic acid is insufficiently soluble in the polymer. Further, one would not select R to be

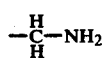

because it would be obvious that this would interefere with the cure reaction.

Having thus generally defined the invention, the following specific examples are provided as illustrative of preferred embodiments of the invention.

EXAMPLE I

The following hydroxyl-terminated polybutadiene (HTPB) recipe was used as a control formulation:

| | | |
|---|---|---|
| Polymer | HTPB Arco Poly BDR -45-M Equivalent wt 1300 | 13.75 gms |
| Curative | Dimeryl diisocyanate (DII) | 2.94 gms |
| Plasticiser | Isodecyl pelargonate (IDP) | 7.15 gms |
| Antioxidant | N, N¹ dinaphthyl-p-phenylenediamine (DNP) | 0.25 gms |
| | Ferric ion (as ferric decanoate) | 10 ppm |

The gel time of the gumstock at 60° was determined and the effect of 0.25 wt. % of the additives of this invention and representative additives of the prior art was determined. The results are set forth in Table I.

TABLE I

| Additive | Gel Time at 60° C.(hr) |
|---|---|
| None | 12.8 |
| Pyrogallol | 32.6 |
| Methyl gallate | 29.5 |
| Propyl gallate | 29.9 |
| Decyl gallate | 27.4 |
| Purpurogallin | 32.3 |
| Alizarin | 33.1 |
| Gallacetophenone | 23.1 |
| Gallic acid | 10.3 |
| Gallein | 7.9 |
| Tannic Acid | 14.4 |
| Phenol | 10.2 |
| Catechol | 9.2 |
| Resorcinol (1,2 dihydroxybenzene) | 14.0 |
| Phloroglucinol | 8.0 |
| Hydroquinone | 9.1 |
| 1,4,9,10 tetrahydroxyanthracene | 4.9 |
| 1,4 dihydroxyanthraquinone | 9.3 |
| 1,8 dihydroxyanthraquinone | 11.2 |
| Salicylaldehyde | 3.8 |
| Mark 1475 chelator (Argus Chemical) | 4.8 |
| Cygard R - 2160 (American Cyanamid) | 11.0 |
| Tetrasalicylidene pentaerythrityl tetramine (TSPT) | 33.0 |

As can be seen from Table I, the additives of this invention are effective pot life extenders. They compare in efficacy to the gossypol of U.S. Pat. No. 3,953,260 and TSPT, the preferred embodiment of the Nakagawa et al patent application noted above. The preferred embodiments of pyrogallol and propylgallate, however, are commercially available at far less cost and are substantially less toxic than gossypol, and, unlike gossypol, are not destroyed by exposure to air. As noted above, gallic acid, gallein and tannic acid, although within the broad scope of formula (a) were not particularly good additives because of their insolubility in the polybutadiene polymer.

EXAMPLE 2

The gumstock recipe of Example 1 was modified by the substitution of Ashland CAO-14 antioxidant for the DNP and the amount of propyl gallate needed to extend pot life determined. The results are shown in Table 2.

TABLE 2

| Propyl Gallate % by wt | Gel Time |
|---|---|
| None | 6.4 |
| 0.0001 (1ppm) | 6.7 |
| 0.005 (50 ppm) | 6.0 |
| 0.025 (250 ppm) | 32.0 |
| 0.25 (2500 ppm) | 29.9 |

EXAMPLE 3

The effectiveness of the additives of this invention in extending pot life of gumstocks containing metals other than iron was determined by adding 0.4 wt. % of copper in the form of organic copper compounds for the iron of the recipe of Example 1. The results are shown in Table 3.

TABLE 3

| Additive % by wt. | Iron*(ppm) | Gel Time, hours |
|---|---|---|
| None | None | 26.4 |
| Pyrogallol 0.25% | None | 34.8 |
| Pyrogallol 0.25 | 10 | 27.4 |
| None | 10 | 5.5 |

*as ferric decanoate

As can be seen, the additive of this invention is effective with both copper and combinations of copper and iron.

EXAMPLE 4

A solid propellant having the formulation set forth in Table 4 was prepared.

TABLE 4

| | Wt. % |
|---|---|
| HTPB | 8.6 |
| DII | 1.5 |
| IDP | 1.5 |
| Bonding Agent 3M Co. | 0.3 |
| Antioxidant CAO-14 Ashland Chemical Co. | 0.075 |
| Pyrogallol | 0.025 |
| Ammonium Perchlorate | 69.0 |
| Iron Oxide | 1.0 |
| Aluminum | 18.0 |

The mixture remained castable room temperature for 5 hours. When the pyrogallol was omitted, the mixture became too thick to cast in less than one hour at room temperature. The cast propellant exhibited satisfactory physical properties at −65° F., 70° F. and 165° F.

Having thus described my invention, it will be apparent that modifications can be made by workers skilled in the art without departing from the scope of my invention which is limited only by the following claims wherein:

I claim:

1. A method for extending the potlife of a curable hydroxy-functional polybutadiene polymeric system which comprises adding to said polymeric system a material selected from the group consisting of:

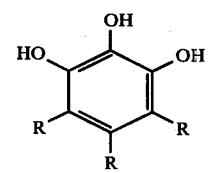

(a)

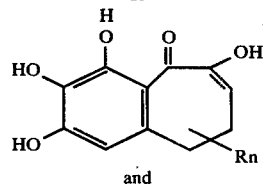

(b)

and

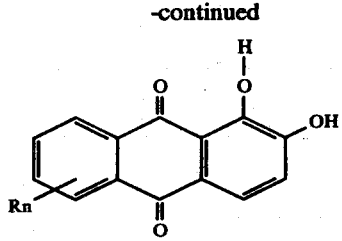

wherein R is a radical which does not interfere with the effectiveness of said material in producing potlife extension.

2. The method of claim 1 wherein said material is selected from the group consisting of pyrogallol, purpurogallin, alizarin, propyl gallate, octyl gallate, decyl gallate, methyl gallate, ethyl gallate, pentaerythrityl gallate, polybutadieneyl gallate, gallamide, gallomine blue, gallocyanine, the acetyl ferrocene condensation product of pyrogallol, the acetyl ferrocene condensation product of purpurogallin, gallotannin, extract of nutgall, extract of oakgall, extract of tanbark, m-galloyl-gallic acid, 1,2,3 trihydroxy-5-butyl benzene, 3,4,5,3',4',5' hexahydroxydiphenylmethane, anthragallol, purpurin, flavopurin, rufigallic acid and gallacetophenone.

3. The method of claim 1 wherein said material is pyrogallol.

4. The method of claim 1 wherein said material is purpurogallin.

5. The method of claim 1 wherein said material is an alkyl gallate in which the alkyl group has from 1-10 carbon atoms.

6. The method of claim 1 wherein said material is alizarin.

7. The method of claims 1; 2; 3; 4; 5, or 6 wherein said polymeric system has a particulate oxidizing agent dispersed therethrough.

8. (a) A curable polymeric system comprising a hydroxy-functional polybutadiene; and (b) A material selected from the group consisting of:

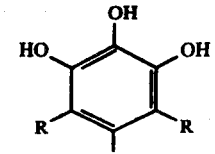

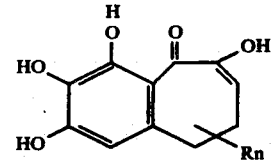

and

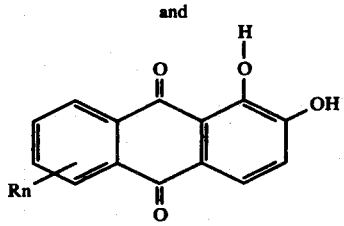

wherein R is a radical which does not interfere with the curability of the polymeric system.

9. The composition of claim 8 wherein said material is selected from the group consisting of pyrogallol, purpurogallin, alizarin, propyl gallate, octyl gallate, decyl gallate, methyl gallate, ethyl gallate, pentaerythrityl gallate, polybutadieneyl gallate, gallamide, gallomine blue, gallocyanine, the acetyl ferrocene condensation product of pyrogallol, the acetyl ferrocene condensation product of purpurogallin, gallotannin, extract of nutgall, extract of oakgall, extract of tanbark, m-galloyl-gallic acid, 1,2,3 trihydroxy-5-butyl benzene, 3,4,5,3',4',5' hexahydroxydiphenylmethane, anthragallol, purpurin flavopurin, rufigallic acid and gallacetophenone.

10. The composition of claim 8 wherein said material is pyrogallol.

11. The composition of claim 8 wherein said material is purpurogallin.

12. The composition of claim 8 wherein said material is an alkyl gallate in which the alkyl group is from 1-10 carbon atoms.

13. The composition of claim 8 wherein said material is alizarin.

14. The composition of claims 8; 9; 10; 11; 12, or 13 further comprising a curing agent for said polymeric system.

15. The composition of claim 14 further comprising a solid particulate oxidizing agent dispersed therethrough.

16. The composition produced upon completion of the curing reaction of the composition of claim 15.